United States Patent
Bösch et al.

(10) Patent No.: US 11,754,827 B2
(45) Date of Patent: Sep. 12, 2023

(54) INSERTION APPARATUS

(71) Applicant: LEICA GEOSYSTEMS AG, Heerbrugg (CH)

(72) Inventors: Thomas Bösch, Lustenau (AT); Josef Müller, Oberegg (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 96 days.

(21) Appl. No.: 17/119,839

(22) Filed: Dec. 11, 2020

(65) Prior Publication Data

US 2021/0181494 A1     Jun. 17, 2021

(30) Foreign Application Priority Data

Dec. 13, 2019  (EP) ..................................... 19216182
Dec. 11, 2020  (EP) ..................................... 20213567

(51) Int. Cl.
*G02B 23/04* (2006.01)
*G01C 3/08* (2006.01)
*G02B 5/20* (2006.01)
*G02B 27/10* (2006.01)

(52) U.S. Cl.
CPC ............... *G02B 23/04* (2013.01); *G01C 3/08* (2013.01); *G02B 5/20* (2013.01); *G02B 27/108* (2013.01)

(58) Field of Classification Search
CPC ........ G02B 23/04; G02B 5/20; G02B 27/108; G01C 3/08
USPC ........................................................ 359/399
See application file for complete search history.

(56) References Cited

U.S. PATENT DOCUMENTS

| 5,886,340 A | 3/1999 | Suzuki |
| 6,072,642 A | 6/2000 | Shirai |
| 6,433,858 B1 | 8/2002 | Suzuki |
| 2013/0093882 A1 | 4/2013 | Kotzur |

(Continued)

FOREIGN PATENT DOCUMENTS

| DE | 19710722 | 10/1997 |
| DE | 19926706 | 12/1999 |
| DE | 19949580 | 4/2000 |

(Continued)

OTHER PUBLICATIONS

European Search Report dated Jun. 18, 2020 as received in application No. 19216182.6.

*Primary Examiner* — Joseph P Martinez
*Assistant Examiner* — Mitchell T Oestreich
(74) *Attorney, Agent, or Firm* — Maschoff Brennan

(57) ABSTRACT

An apparatus for inserting a measurement light beam which can be projected onto a target object, comprising a light-refracting component having an optical axis, and at least two mirrors for deflecting the measurement light beam, and an optical overall body consisting of at least one optically effective material, wherein the optical overall body is configured in such a way that the at least two mirrors are fitted inside or at the edge, in particular as a part, of the optical overall body, in such a way that the measurement light beam entering the optical overall body is offset parallel to the incident measurement light beam when emerging from the optical overall body, so that the emerging measurement light beam lies on the optical axis of the light-refracting component of the apparatus and is projected in this form onto the target object.

14 Claims, 11 Drawing Sheets

(56) References Cited

U.S. PATENT DOCUMENTS

2016/0223805 A1* 8/2016 Waterman ............... F41G 3/065

FOREIGN PATENT DOCUMENTS

| EP | 1 686 350 | A1 | 8/2006 |
| EP | 2405236 | A1 | 1/2012 |
| EP | 2929280 | A2 | 10/2015 |

* cited by examiner

INSERTION APPARATUS

CROSS-REFERENCE TO RELATED APPLICATIONS

This application claims priority to European Patent Application Nos. 19216182.6, filed on Dec. 13, 2019 and 20213567.9, filed on Dec. 11, 2020. The foregoing patent applications are herein incorporated by reference.

FIELD OF INVENTION

The invention relates to an apparatus according to claim 1 for inserting a measurement light beam.

BACKGROUND

For the surveying of target points, many surveying devices have been known since antiquity. Range and direction or angle from a measuring device to the target point to be surveyed are in this case recorded as spatial standard data, and in particular the absolute position of the measuring device is acquired in addition to possibly existing reference points. Typical target points are in this case church towers, surveying poles, retroreflectors or significant points in interiors.

Widely known examples of such surveying devices are the theodolite, tachymeter and total station (which is also referred to as an electronic tachymeter or computer tachymeter). For example, a geodetic measuring apparatus of the prior art is described in the publication EP 1 686 350 A1, the geodetic surveying device being used here only as an example. Such devices have electrical-sensor angle and distance measurement functions which allow determination of direction and distance to a selected target. The angle or distance values are in this case determined in the internal reference system of the device, and may also need to be linked with an external reference system for absolute position determination.

Modern total stations have microprocessors for digital postprocessing and storage of recorded measurement data. The devices generally have a compact and integrated design, there usually being coaxial distance measuring elements as well as computation, control and storage units in a device. Depending on the level of development of the total station, motorization of the targeting or sighting device and means for automatic target searching and tracking may furthermore be integrated. As a man-machine interface, the total station may comprise an electronic display/control unit—generally a microprocessor computation unit with electronic data storage means—having a display and input means, for example a keypad. The display/control unit is supplied with the measurement data recorded by electrical sensors, so that the position of the target point can be determined, optically displayed and stored by the display/control unit. Total stations known from the prior art may furthermore have a radio data interface for setting up a radio link to external peripheral components, for example to a hand-held data recording device, which may in particular be configured as a data logger or field computer.

In order to sight or target the target point to be surveyed, surveying devices of the species comprise a target telescope, for example an optical telescope, as a sighting instrument. The target telescope is generally rotatable about a vertical upright axis and a horizontal tilt axis relative to a base of the measuring device, so that the telescope can be aligned with the point to be surveyed by swiveling and tilting. In addition to the optical viewing channel, modern devices may comprise a camera for recording an image, which is integrated into the target telescope and is for example aligned coaxially or parallel, in which case the recorded image may in particular be represented as a live image on the display of the display/control unit and/or on a display of the peripheral device—for example the data logger—used for the remote control. The optics of the sighting instrument may in this case comprise a manual focus—for example an adjusting screw for varying the position of focusing optics—or it may have an autofocus, the variation of the focal position being carried out for example by servo motors. Automatic focusing instruments for target telescopes, for example of geodetic devices, are known for example from the documents DE 19710722, DE 19926706 or DE 19949580.

The precise optoelectronic surveying of a distant object often requires an additional illumination source, which generates a measurement light beam with which the object to be surveyed is illuminated. Ideally, the measurement light beam illuminating the object to be surveyed is in this case collinear with the optical axis of the objective lens, for example used in the measuring telescope, in order to minimize the occurrence of parallaxes. In order to achieve maximally optimal use, for example of a measuring telescope, in the general case it is then necessary for the insertion apparatus to be positioned around the optical axis of the light-refracting components of the optical system, so that the inserted measurement light beam lies on the optical axis. Collinear solutions according to the prior art are shown in FIGS. 6-9. A disadvantage of the solution outlined in FIG. 6 is in this case the lack of mechanical stability of the arrangement in the event of impact, as well as a central shadow occurring in an image sensor which is positioned behind the arrangement shown in FIG. 6. Such a central shadow then prevents the surveying of an object which lies in the near field of the optical system. The solution according to the prior art as shown in FIG. 7 has similar disadvantages to the solution represented in FIG. 6. In addition, the solution is also sensitive in respect of thermal instabilities. A further solution possibility according to the prior art is represented in FIG. 8. A splitter plate is positioned in front of the objective lens, for example of a measuring telescope, for the purpose of insertion. Disadvantages of this solution are again the lack of stability in the event of temperature variations as well as mechanical instability. Furthermore, the solution presented in FIG. 8 is not compact and also leads to a complete intensity loss over the entire entry pupil. A further solution according to the prior art is represented in FIG. 9. The main disadvantage of this apparatus is that multiple reflections can occur in the main objective lens.

Besides the collinear solutions mentioned here, a noncollinear arrangement, in which the measurement beam which illuminates the measurement object is not parallel to the optical axis of the objective lens, for example of a measuring telescope, is also conceivable. Noncollinear illuminations of the measurement point generally lead to the occurrence of parallaxes, which then need to be corrected.

BRIEF DESCRIPTION

The object of providing an improved insertion apparatus is achieved by implementing the characterizing features of the independent claim. Features which alternatively or advantageously refine the invention may be found in the dependent patent claims.

Some aspects of the invention relate to an apparatus for inserting a measurement light beam which can be projected onto a target object, comprising a light-refracting component having an optical axis, and at least two mirrors for deflecting the measurement light beam, and an optical overall body consisting of at least one optically effective material, wherein the optical overall body is configured in such a way that the at least two mirrors are fitted inside or at the edge, in particular as a part, of the optical overall body, in such a way that the measurement light beam entering the optical overall body is offset parallel to the incident measurement light beam when emerging from the optical overall body, so that the emerging measurement light beam lies on the optical axis of the light-refracting component of the apparatus and is projected in this form onto the target object.

The optical overall body forms a rigid unit together with the at least two mirrors. In particular, the optical overall body and the at least two mirrors are firmly connected mechanically. A mirror fitted at the edge of the optical overall body may, in particular, be fitted on an edge surface of the optical overall body.

In one embodiment, a first of the at least two mirrors is intersected by the optical axis. The first mirror has a mirror extent when projected onto the plane orthogonal to the optical axis, and the optical overall body has an overall extent when projected onto the plane orthogonal to the optical axis. The ratio of the mirror extent to the overall extent is less than 0.5 and in particular less than 0.3, and advantageously less than 0.1.

The first mirror may therefore extend less than the optical overall body in a plane which is orthogonal to the optical axis.

In one embodiment, the entire beam path of the light-refracting component crosses the optical overall body, and/or the overall extent is at least as great as an objective lens extent, the light-refracting component having the objective lens extent when projected onto a plane orthogonal to the optical axis.

In one embodiment, the beam path passing through the light-refracting component fully crosses the optical overall body. The beam path is therefore acquired fully by the optical overall body. The light rays refracted by the light-refracting component therefore pass through the optical overall body.

The overall extent is therefore preferably as great as the objective lens extent, so that the optical overall body can preferably modify the overall beam path to the same extent. The optical overall body and the light-refracting component also extend spatially in an orthogonal direction, which is orthogonal to the optical axis and to the direction of the overall extent, or of the objective lens extent. Preferably, the optical overall body is also at least as large as the light-refracting component in the orthogonal direction. The first mirror may have a smaller extent than the optical overall body in the orthogonal direction. By such a smaller extent of the first mirror, partial shadowing produced by the first mirror may be restricted to a central region.

In one embodiment, the optical overall body is in the form of a compound of at least two optical bodies or as a compound of at least one optical body and at least one optical partial body, the two of the at least two mirrors being fitted only on the edge surfaces of at least one of the optical bodies. The mirrors are fitted on optical bodies, and not on optical partial bodies.

In one embodiment, the at least two optical bodies or the at least one optical body and the at least one optical partial body are connected to one another at a cement surface, the cement surface being parallel to the optical axis.

A cement surface extending substantially parallel to the optical axis may minimize possible wedge errors, wedge errors being capable of contributing to undesired beam deflection, which may lead to double images. Deviations of 5° to 10° from parallelism may also lead to a reduction of wedge errors. Such double images may occur in a connection region, for example on and around connection surfaces between two optical bodies, or between an optical body and an optical partial body. The cement surface may lie in a plane, this being a plane which may be parallel to the optical axis. Cement surfaces, or the planes in which the cement surfaces may lie, may therefore be parallel to the optical axis in order to minimize wedge errors. In one embodiment, the optical overall body is composed of precisely one optical body and precisely one optical partial body.

In one embodiment, the optical body which the optical overall body comprises is configured in a plane-parallel and prismatic shape, and the optical partial body is likewise in a plane-parallel and prismatic shape.

In one embodiment, at least one of the at least two mirrors is implemented as a splitter layer, so that there is only partial shadowing at the center of a distance sensor for detecting the measurement light beam reflected by the target object, which distance sensor is positioned orthogonally with respect to the optical axis of the light-refracting component and the sensor midpoint of which is intersected by the optical axis.

In one embodiment, the optical overall body comprises the light-refracting component, so that both the measurement light beam offset and optical imaging are carried out by the optical overall body.

In one embodiment, the splitter layer is adjusted in such a way that near-field measurements are made possible, in particular by a dichroic filter as the splitter layer.

In one embodiment, the splitter layer is adjusted in such a way that it selectively constitutes a splitter for the wavelength of the measurement light source used, in particular for a laser source in the near infrared range and is transmissive at other wavelengths.

In one embodiment, the light-refracting component is formed as a diffractive optical element, in particular for example as a composite replicate on glass.

In one embodiment, two parallel surfaces, on which two of the at least two mirrors are fitted, of the at least one first optical body form an equal angle with respect to the incidence direction of the measurement light beam, the angle being in particular 43 degrees.

The angle may also have a value in the range of from 41 to 45 degrees.

The angle between the two of the at least two mirrors and the incidence direction of the measurement light beam may depend on the orientation of the first optical body.

In one embodiment, both the optical body and the optical partial body are configured as a glass body and/or as a plastic body, in particular consisting of polycarbonate or polymethyl methacrylate or a cyclic olefin copolymer or a cyclic olefin polymer, and/or as a ceramic body, in particular consisting of sapphire or AlON.

Some aspects of the invention furthermore relate to a coordinate measuring device which comprises an apparatus according to claim 1, which may be used to insert a measurement light beam.

The invention furthermore relates to a coordinate measuring device which comprises an apparatus according to claim 7, so that surveys in the near-field range can be carried out with the aid of the coordinate measuring device.

Some aspects of the invention furthermore relate to a coordinate measuring device, wherein the coordinate measuring device is configured as a theodolite, tachymeter or total station.

BRIEF DESCRIPTION OF THE DRAWINGS

The apparatus according to the invention will be described in more detail purely by way of example below with the aid of specific exemplary embodiments schematically represented in the drawings, further advantages of the invention also being discussed. In detail.

DETAILED DESCRIPTION

Figure 1:
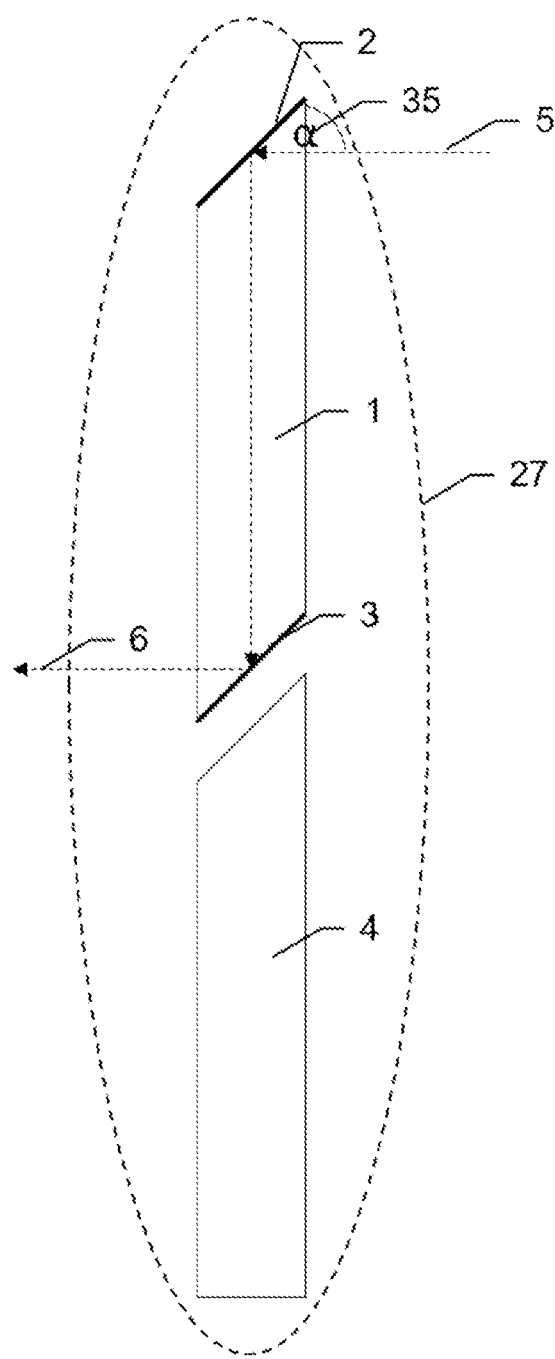
FIG. 1 shows an embodiment of an apparatus according to the invention for inserting a measurement light beam.

FIG. 1 shows a first embodiment of an apparatus according to the invention for inserting a measurement light beam, in the form of an optical overall body 27 comprising an optical body 1 and an optical partial body 4. The embodiment comprises a plane-parallel prismatic optical body 1, which is provided with a primary mirror 2 and a secondary mirror 3. An incident measurement light beam 5 is deflected by the two mirrors in such a way that it leaves the optical body as an emerging measurement light beam 6 with a parallel offset with respect to the incident measurement light beam. The two mirrors have an equal angle α 35 with respect to the incident and emerging measurement light beams, which may for example be 43 degrees. An optical partial body 4 is formed in such a way that it can be connected to the optical body 1. Cementing may be selected as a possible connecting method. In the general case, the refractive indices of the optical body 1 and of the optical partial body 4 are substantially the same, so that no light refraction, or only very weak light refraction, takes place at the transition between the optical body 1 and the optical partial body 4. For example, the two mirrors are provided for the visible and near infrared ranges.

Figure 2:
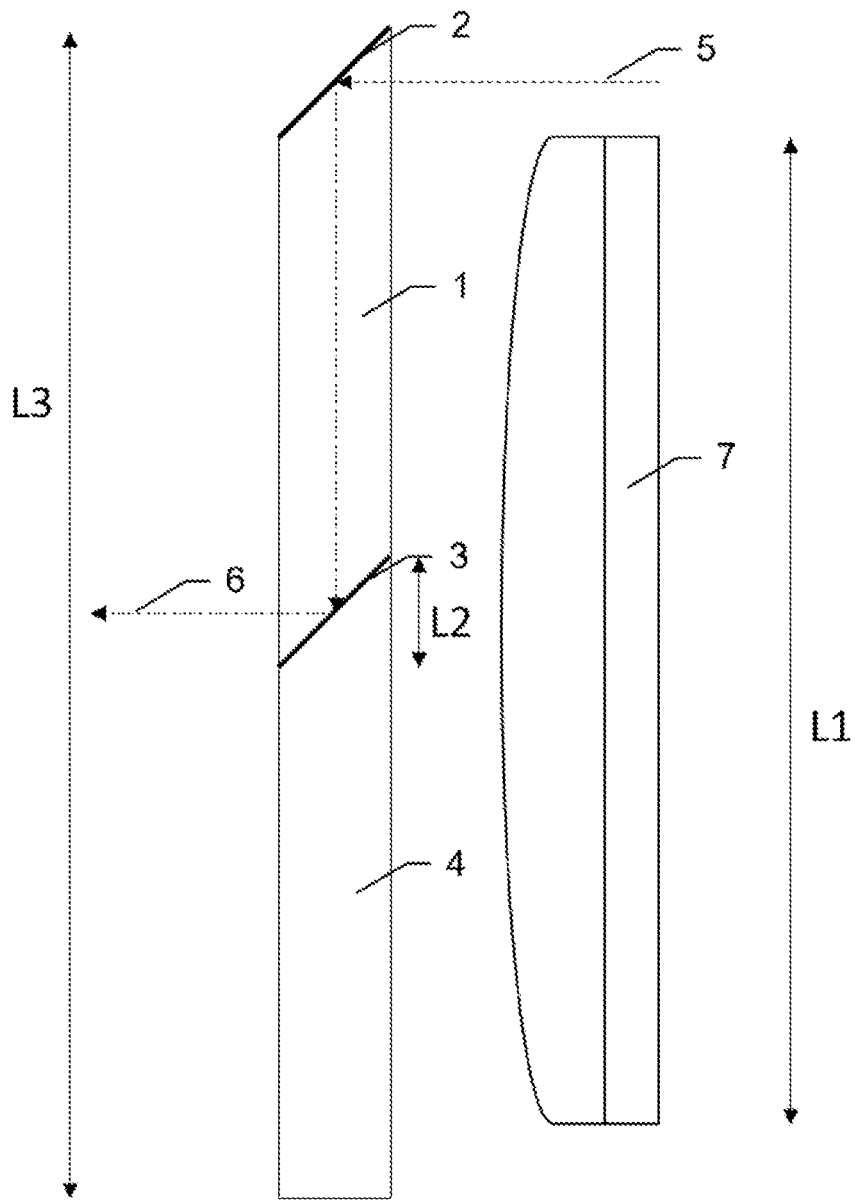
FIG. 2 shows an embodiment of an apparatus according to the invention for inserting a measurement light beam, comprising a separate light-refracting component.

In FIG. 2, a light-refracting component 7, which is arranged behind the optical overall body, is positioned next to the optical overall body, which comprises the optical body 1 and the optical partial body 4 and which is constructed according to the description given for FIG. 1. The light-refracting component is in this case used as an objective lens, for example of a measuring telescope, and may be shaped in any desired way. The light-refracting component 7 has an optical axis. Perpendicularly to the optical axis, i.e. projected onto a plane perpendicular to the optical axis, the light-refracting component 7 has an objective lens extent L1. The optical overall body in turn has an overall extent L3 when projected onto the same plane. The overall extent may be adjusted in such a way that the beam path passing through the light-refracting component 7 passes fully through the optical overall body. In particular, L3 may be greater than L1. The primary mirror 3 positioned in the optical overall body has—when projected onto the same plane—a mirror extent L2. The mirror extent L2 is less than the overall extent L3.

Figure 3:
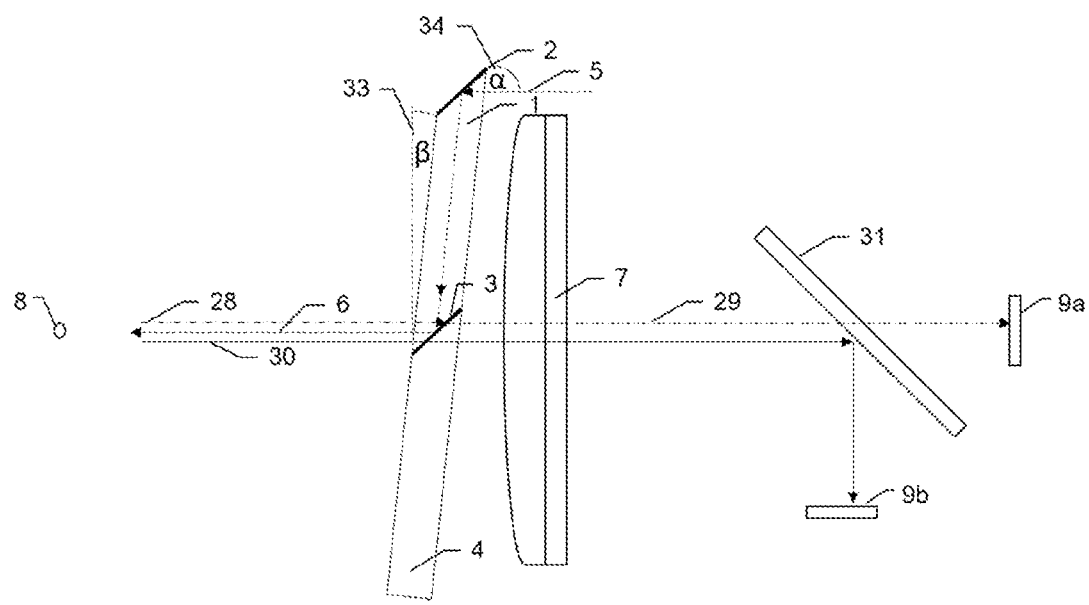
FIG. 3 shows an embodiment of an apparatus according to the invention for inserting a measurement light beam, the apparatus according to the invention being fitted in a measuring telescope.

FIG. 3 embeds the arrangement according to FIG. 2 in a measuring telescope, FIG. 3 containing, in addition to FIG. 2, a measurement point 8, an image sensor 9b, a distance sensor 9a, which is configured in particular as an APD or SPAD array, and a wavelength-dependent semitransparent splitter plate 31. The optical overall body of FIG. 2 is tilted by an angle β 33 which may, in particular, be 2 degrees. The two mirrors have an equal angle α 34 with respect to the incident and emerging measurement light beams, in which case the angle α 34 may in particular be 43 degrees. The angles α 34 and β 33 are adjustable over a wide range. Tilting of the optical overall body of FIG. 2 by an angle β 33 may serve to avoid unintended reflections in the direction of the light-refracting component 7. The arrangement is furthermore robust in respect of manufacturing inaccuracies, since variations of α 34 and β 33 do not have a substantial effect on the insertion process. The measuring telescope may be a constituent part of a coordinate measuring device. The emerging measurement light beam 6, which points in the direction of a measurement point 8, is reflected by the latter. The reflected light rays 28 of the measurement light beam are then partially transmitted by the secondary mirror 3, which is formed as a splitter layer for the wavelength of the measurement light beam, which lies in the near infrared range, and which is transmissive for light visible to the human eye, whereupon the reflected measurement light beam 29, which is attenuated by the secondary mirror 3, passes through the wavelength-dependent semitransparent splitter plate 31 and is recorded by a distance sensor 9a, which is configured in particular as an avalanche photodiode and is intended for distance measurement. Light 30 in the wavelength range visible to the human eye coming from the measurement point 8 is fully transmitted by the secondary mirror 3 and thereupon deflected by the wavelength-dependent semitransparent splitter plate 31 onto an image sensor 9b. The distance sensor 9a and the image sensor 9b therefore constitute an interface with further electronic processing of the recorded images.

One advantage of the arrangement shown in FIG. 3 is the mechanical and thermal stability of the insertion apparatus. Mechanical stability is achieved in particular by the two mirrors used for the deflection being embedded between or on solid glass or another optically effective material, so that the apparatus is robust in relation to a mechanical impact. Since all the materials may furthermore have a similar behavior in the event of thermal variations, the sensitivity of the insertion apparatus to such changes can be minimized. The compact design of the insertion apparatus also minimizes the number of surfaces which can be contaminated. Lastly, the insertion apparatus shown in FIG. 3 also does not lead to the occurrence of parallaxes, since the emerging measurement light beam 6 is collinear with the optical axis of the light-refracting component 7. Small translational movements of the insertion apparatus along the optical axis of the light-refracting component 7 and orthogonally to this axis, as well as small rotational movements about this axis, have no effect on the emerging measurement light beam 6.

Figure 4:
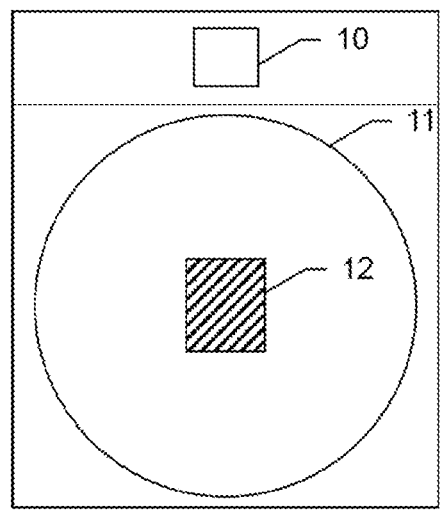
FIG. 4 shows an embodiment corresponding to FIG. 3, the arrangement being viewed from the front.

FIG. 4 views the arrangement of FIG. 3 from the front, i.e. looking from the measurement point 8 in the direction of the distance sensor 9a. FIG. 4 in this case shows the location of the incident measurement light beam 10, the entry pupil 11 of the measurement light beam after reflection at the measurement point 8 and the region in the distance sensor 9a in which there is partial shadowing 12. So that there is only partial shadowing for the arrangement represented in FIG. 3, in particular the lower mirror 3 in the optical body 1 may be implemented as a splitter layer. The lower mirror 3 may, for example, form a splitter layer for wavelengths in the near infrared range and be entirely transmissive for other wavelengths. With the aid of implementation of the lower mirror 3 as a splitter layer, it is possible to carry out near-field measurements with the measuring telescope shown in FIG. 3, since the central regions of the distance sensor 9a are now also illuminated. Implementation of the lower mirror 3 as a splitter layer furthermore allows measurements on high-quality retroreflectors which are fitted at the measurement point 8, without the measurement light beam needing to be expanded.

In order to achieve spatially centered partial shadowing 12, it is advantageous to restrict the spatial extent of the primary mirror 3 in comparison with the spatial extent of the optical overall body. Advantageously, the mirror extent L2 is less than the overall extent L3. The primary mirror 3 may also have a smaller extent than the optical overall body in an orthogonal direction, which is orthogonal to the direction of the overall extent L3 and to the optical axis. Alternatively, the primary mirror 3 may have a similar extent to the optical overall body in the orthogonal direction.

In this case, there is partial shadowing in a region which is larger in the orthogonal direction than in the direction of the overall extent L3.

There is therefore partial shadowing 12 not in the region of the entire entry pupil 11 but only in a smaller region, the primary mirror 3 influencing the extent of the partial shadowing region. Advantageously, more light therefore reaches the light-refracting component.

Figure 5:
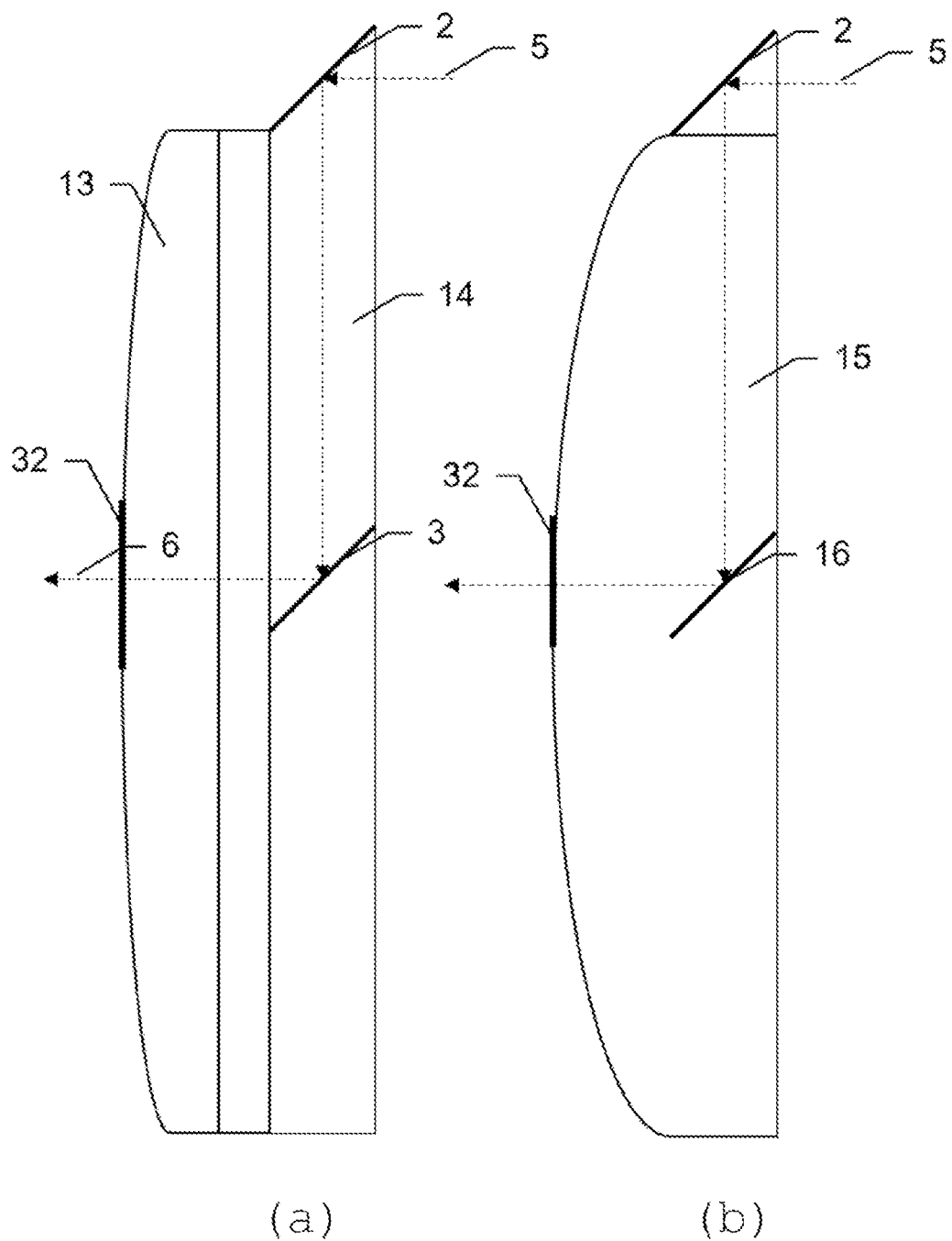
FIG. 5 shows further embodiments of an apparatus according to the invention for inserting a measurement light beam.

FIG. 5 shows alternative embodiments of an apparatus according to the invention. FIG. 5a shows an arrangement in which the light-refracting component 13 is firmly connected to the optical overall body 14. One advantage of this arrangement is increased mechanical stability. The light-refracting component may, in particular, be smaller than the optical overall body. The light-refracting component 13 is locally planar 32 around the optical axis on the surface not touching the optical overall body 14.

FIG. 5b in turn shows an embodiment in which the optical overall body 15 is formed in such a way that it can simultaneously be used for inserting a measurement light beam 5 and for optical imaging. The optical overall body 15 is therefore used both for insertion and as a light-refracting component. The lower mirror 16 may be either configured as represented or, alternatively, continued as far as the curved surface. Advantages of the arrangement shown in FIG. 5b are that only one object is necessary for the insertion and the optical imaging, and that the implementation in the form shown has a high mechanical stability. The optical overall body 15 is locally planar 32 at its apex.

Figure 6:
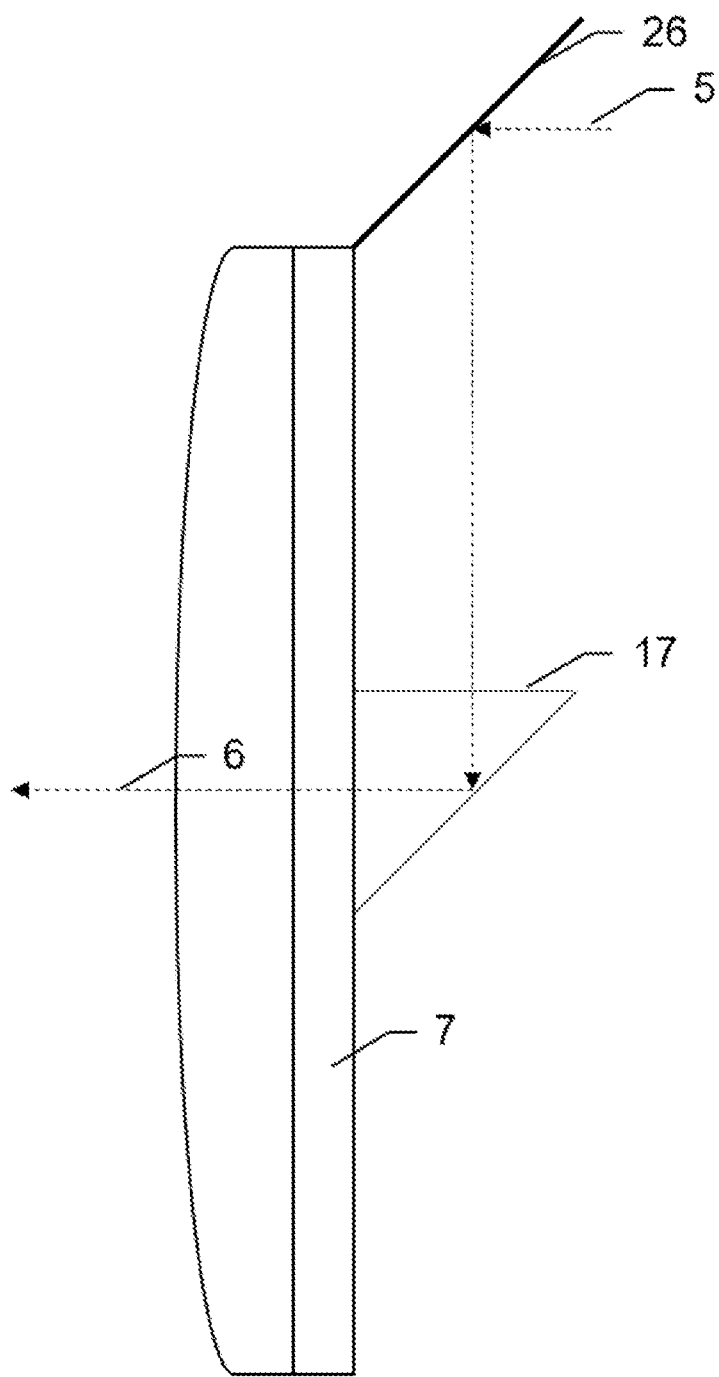
FIG. 6 shows an embodiment of the insertion of a measurement light beam according to the prior art, using a prism fitted on a light-refracting component for the insertion.

FIG. 6 shows an embodiment of the insertion of a measurement light beam 5 according to the prior art. By means of a mirror 26, the incident measurement light beam 5 is deflected in the direction of a prism 17, the prism 17 being fitted on a light-refracting component 7. The prism 17 is in this case used for the insertion and deflects the incident beam in such a way that it is collinear with the optical axis of the light-refracting component 7.

Figure 7:
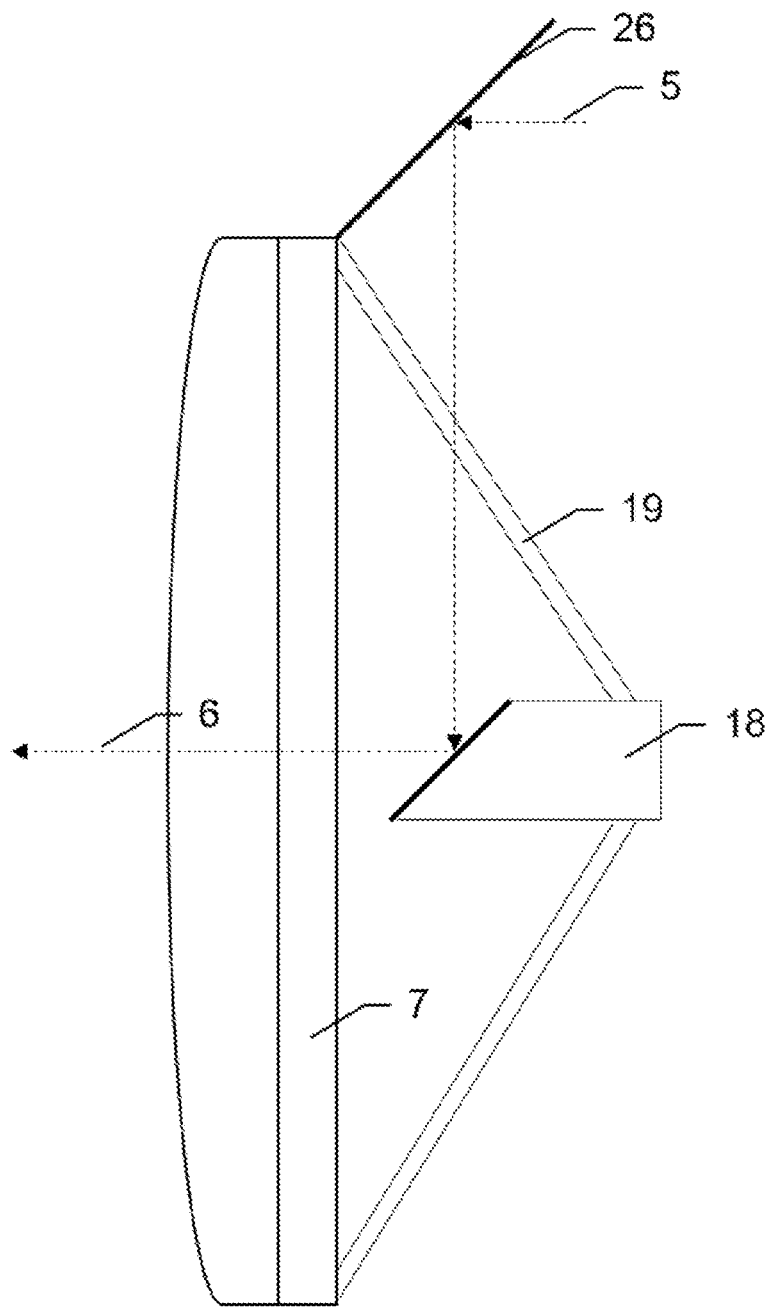
FIG. 7 shows an embodiment of the insertion of a measurement light beam according to the prior art, using a beam carrier mechanically fastened on a light-refracting component for the insertion.

FIG. 7 shows a further embodiment of the insertion of a measurement light beam 5 according to the prior art. By means of a mirror 26, the incident measurement light beam 5 is deflected in the direction of a mirror carrier 18. The mirror carrier 18 is brought into correspondence with the light-refracting component 7 by means of a mechanism 19. An incident measurement light beam 5 deflected by the mirror 26 is deflected by the mirror carrier 18 in the direction of the optical axis of the light-refracting component 7.

Figure 8:
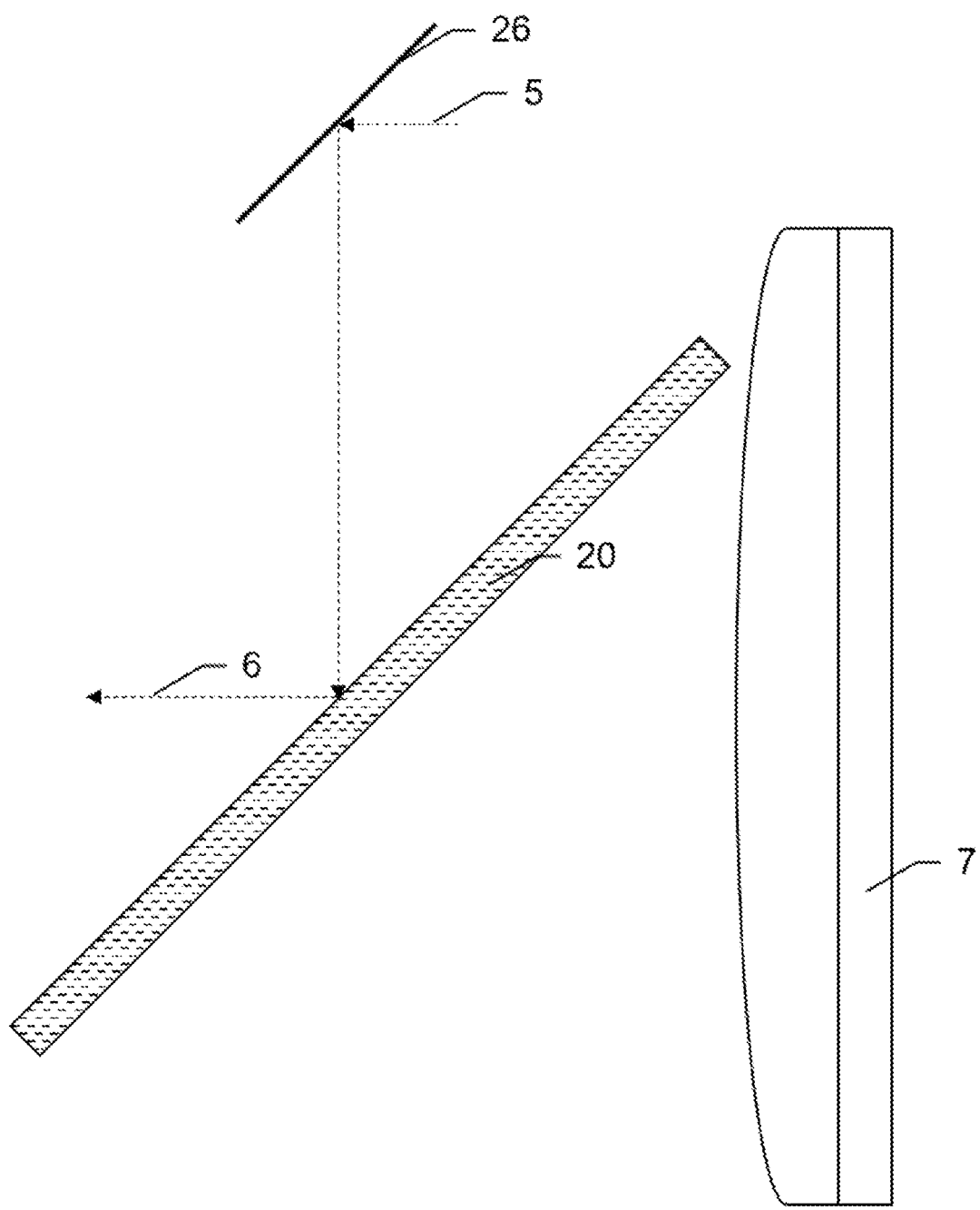
FIG. 8 shows an embodiment of the insertion of a measurement light beam according to the prior art, using a splitter layer arranged in front of a light-refracting component for the insertion.

FIG. 8 shows a further embodiment of the insertion of a measurement light beam 5 according to the prior art. By means of a mirror 26, the incident measurement light beam 5 is deflected in the direction of a splitter plate 20. The splitter plate 20 is positioned in front of a light-refracting component 7 in such a way that the measurement light beam reflected by the splitter plate 20 lies on the optical axis of the light-refracting component 7.

Figure 9:
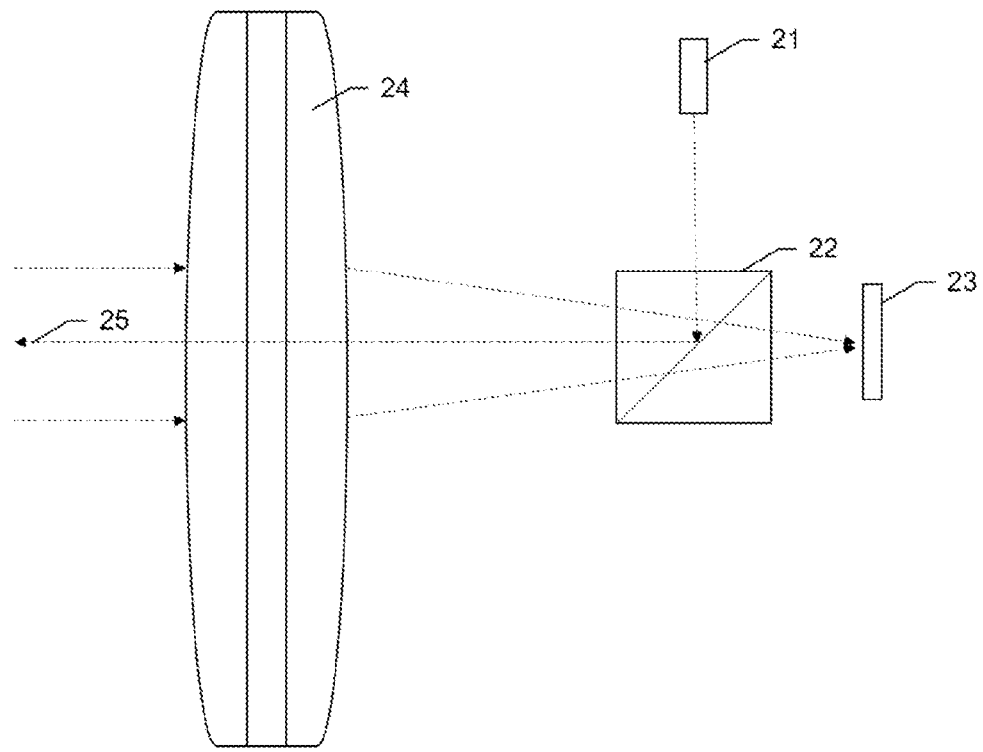
FIG. 9 shows an embodiment of the insertion of a measurement light beam according to the prior art, using a splitter cube for the insertion.

FIG. 9 shows a further embodiment of the insertion of a measurement light beam according to the prior art. A source 21 producing a measurement light beam projects the measurement light beam in the direction of a splitter cube 22, which partially deflects the measurement light beam in such a way that the measurement light beam lies on the optical axis of a main objective lens 24. The emerging measurement light beam 25 is then deflected onto a measurement point. An image sensor 23 then records the light rays reflected by the target object and collimated by the main objective lens 24.

Figure 10:
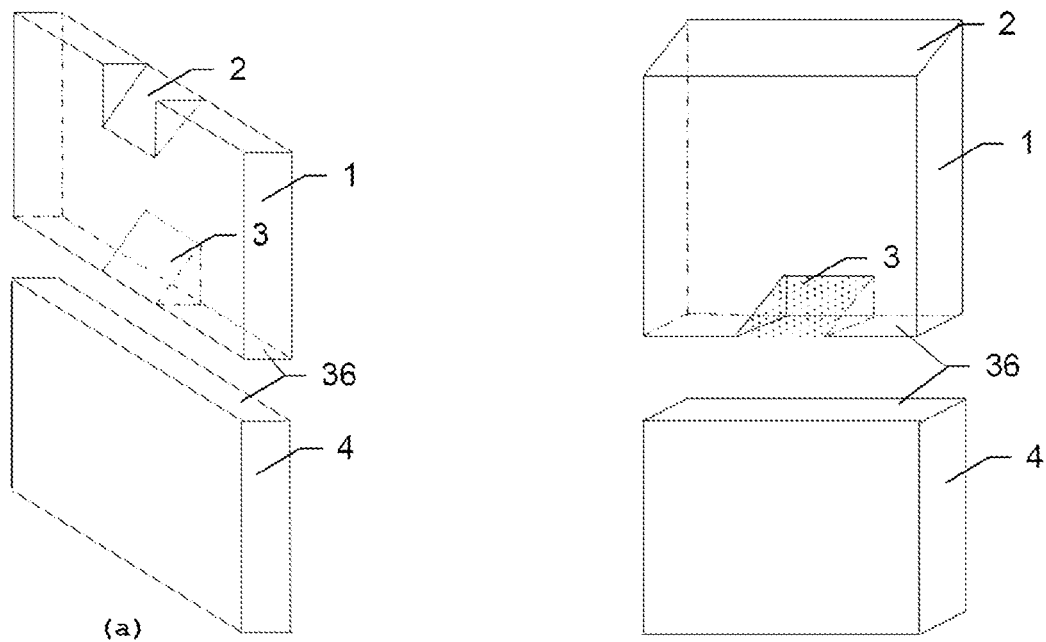
FIG. 10 shows two embodiments of an apparatus according to the invention for inserting a measurement light beam.

FIG. 10a shows a further embodiment of an apparatus according to the invention for the insertion of a measurement light beam, in the form of an optical overall body comprising an optical body 1 and an optical partial body 4. The optical body 1 and the optical partial body 4 are represented as being spatially separated from one another in FIG. 10a, the optical body 1 and the optical partial body 4 being connected as part of the optical overall body and there consequently being no distance between them. Two mirrors 2,3 for deflecting a measurement light beam are incorporated into the optical body 1. The optical body 1 and the optical partial body 4 are connected to one another at a cement surface 36 which lies in a plane parallel to the optical axis of the light-refracting component (not shown).

FIG. 10b shows a further embodiment of an apparatus according to the invention for the insertion of a measurement light beam, in the form of an optical overall body comprising an optical body 1 and an optical partial body 4. A mirror 3 is fitted on an edge surface of the optical body 1, the edge surface lying in a recess. The recess may, for example, be produced by means of etching. The optical body 1 and the optical partial body 4 are firmly connected to one another at a cement surface 36 which, as described in FIG. 10a, is parallel to the optical axis of the light-refracting component (not shown).

Figure 11:
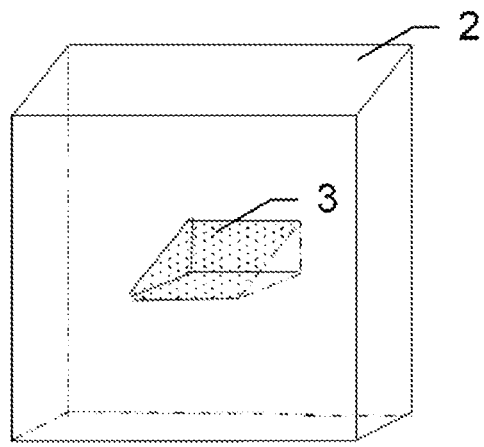
FIG. 11 shows an embodiment of an apparatus according to the invention for inserting a measurement light beam.

FIG. 11 shows a further embodiment of an apparatus according to the invention for the insertion of a measurement light beam, in the form of an optical overall body. The optical overall body comprises two mirrors 2,3, the lower mirror 3 being fitted on an edge surface of a wedge-shaped recess.

Figure 12:
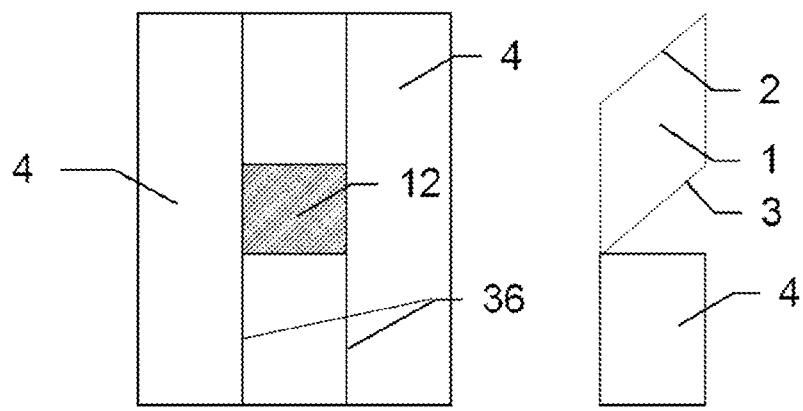
FIG. 12 shows an embodiment of an apparatus according to the invention for inserting a measurement light beam.
Figure 13:
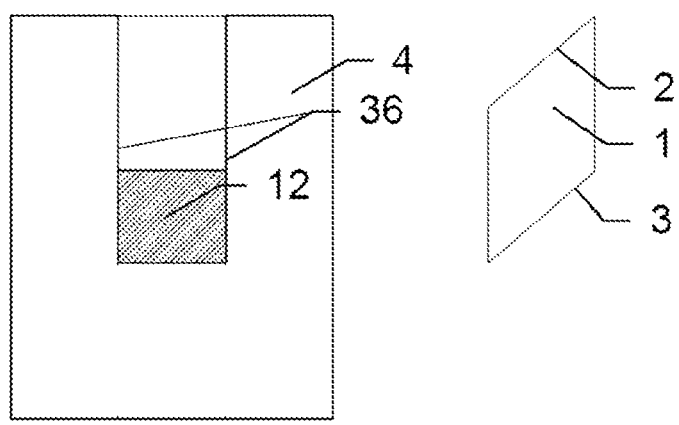
FIG. 13 shows an embodiment of an apparatus according to the invention for inserting a measurement light beam.

FIGS. 12 and 13 show further embodiments of an apparatus according to the invention for the insertion of a measurement light beam, in the form of an optical overall body comprising an optical body 1 and three optical partial bodies 4 (in FIG. 12) or one optical partial body 4 (in FIG. 13). In FIGS. 12 and 13, a plan view in the direction of the optical axis is respectively shown in the left partial images of the figures, and a plan view of the central portions shown in the left partial images is respectively shown in the right partial images. In FIGS. 12 and 13, partial shadowing regions 12 which are caused by the lower mirror 3 are schematically represented. The optical partial body or bodies 4 are connected to the optical body 1 at cement surfaces 36 which are parallel to the optical axis (not shown).

Figure 14:
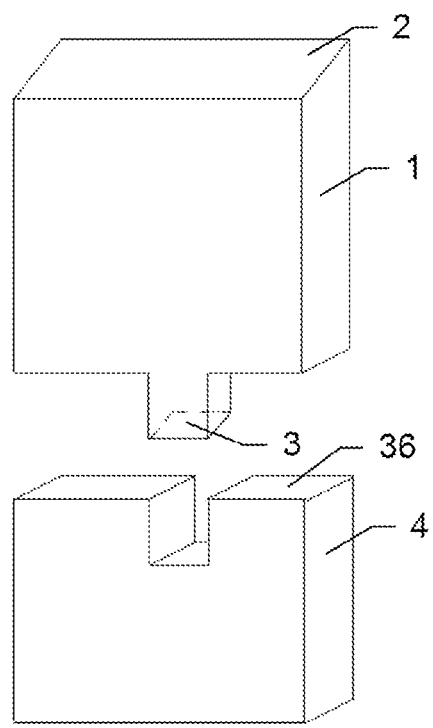
FIG. 14 shows an embodiment of an apparatus according to the invention for inserting a measurement light beam.

FIG. 14 shows a further embodiment of an apparatus according to the invention for the insertion of a measurement light beam, which resembles the embodiment shown in FIG. 11. The lower mirror 3 lies not in a recess of the optical body, as shown in FIG. 11, but on an edge surface of a part of the optical body 1 protruding from the optical body 1. The optical body 1 and the optical partial body 4 may be connected to one another at a cement surface 36 which is parallel to the optical axis (not shown).

Figure 15:
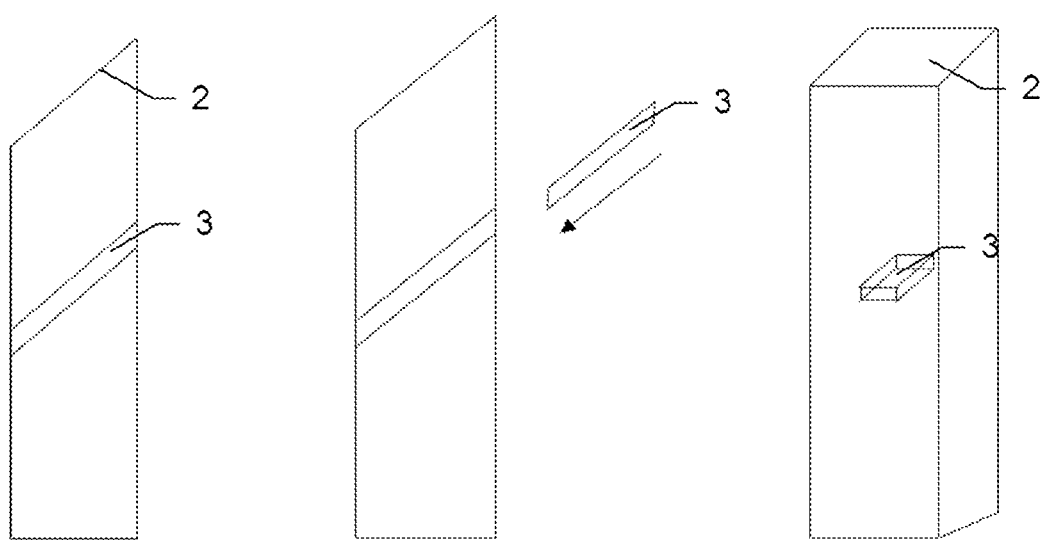
FIG. 15 shows an embodiment of an apparatus according to the invention for inserting a measurement light beam.

FIG. 15 is similar to FIG. 1, although in contrast to FIG. 1 the lower mirror 3 has a spatial extent. The central image of FIG. 15 shows that the lower mirror 3 may be pushed into a recess. As shown in the right image of FIG. 15, the lower mirror 3 introduced in this way may have a limited width extent.

Figure 16:
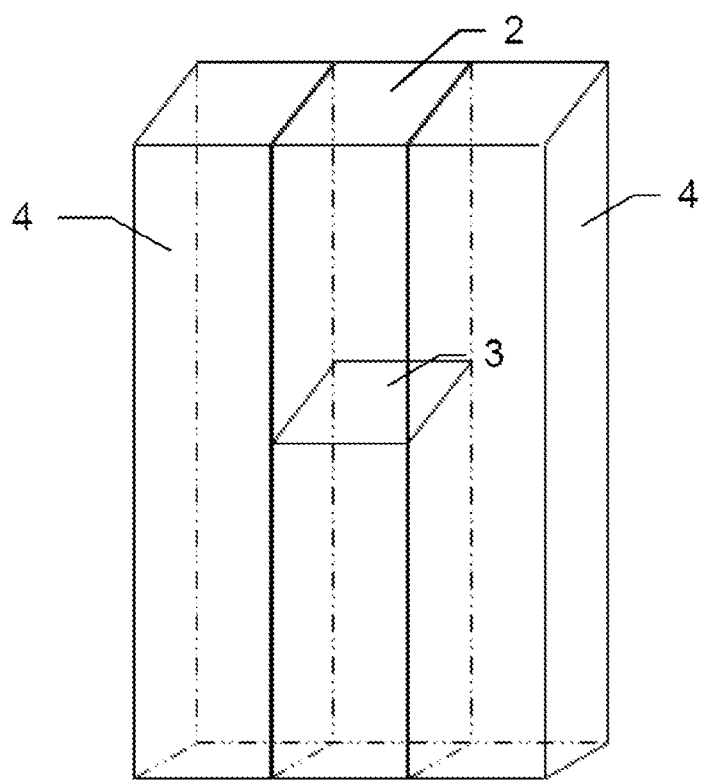
FIG. 16 shows an embodiment of an apparatus according to the invention for inserting a measurement light beam.

The embodiment shown in FIG. 16 is similar to the embodiment shown in FIG. 12, the partial body lying under the lower mirror 3 extending as far as the lower mirror 3 in FIG. 16, while in FIG. 12 there is an air gap between the lower mirror 3 and the underlying partial body.

It is to be understood that these figures as represented only schematically represent possible exemplary embodiments. The various approaches may likewise be combined with one another and with methods and devices of the prior art.

The invention claimed is:

1. An apparatus for inserting a measurement light beam which can be projected onto a target object, the apparatus comprising:
    a measuring telescope;
    a light-refracting component having an optical axis, whereby the light-refracting component is used as an objective lens of the measuring telescope;
    at least two mirrors for deflecting the measurement light beam; and
    an optical overall body comprising at least one optical material,
    wherein the optical overall body is configured in such a way that the at least two mirrors are fitted inside or at the edge of the optical overall body, such that the measurement light beam entering the optical overall body is offset parallel to the incident measurement light beam when emerging from the optical overall body, such that the emerging measurement light beam lies on the optical axis of the light-refracting component of the apparatus and is projected in this form onto the target object,
    wherein the apparatus is configured as a coordinate measuring device for measuring range and direction or angel to a point of the target object.

2. The apparatus according to claim 1, wherein a first of the at least two mirrors is intersected by the optical axis and the first mirror has a mirror extent (L2) when projected onto a plane orthogonal to the optical axis, and in that the optical overall body has an overall extent (L3) when projected onto the plane orthogonal to the optical axis, the ratio of L2 to L3 is less than 0.5, wherein:
    the mirror extent (L2) is a dimension the mirror extends on the plane orthogonal to the optical axis; and
    the overall extent (L3) is a dimension the optical overall body extends on the plane orthogonal to the optical axis.

3. The apparatus according to claim 1, wherein the entire beam path of the light-refracting component crosses the optical overall body or an overall extent (L3) of the optical overall body is at least as great as an objective lens extent (L1), the light-refracting component having the objective lens extent (L1) when projected onto the plane orthogonal to the optical axis, wherein:
    the overall extent (L3) is a dimension the optical overall body extends on the plane orthogonal to the optical axis; and
    the objective lens extent (L1) is a dimension the objective lens extends on the plane orthogonal to the optical axis.

4. The apparatus according to claim 1, wherein the optical overall body is in the form of a combination of at least two optical bodies or as a combination of at least one optical body and at least one second optical body, the two of the at least two mirrors being fitted only on the edge surfaces of at least one of the optical bodies, wherein the second optical body has a different shape than the optical body.

5. The apparatus according to claim 4, wherein the at least two optical bodies or the at least one optical body and the at least one optical partial body are connected to one another at an interface, the interface being parallel to the optical axis.

6. The apparatus according to claim 4, wherein the optical overall body is composed of precisely one optical body and precisely one optical partial body, or the optical body which the optical overall body comprises is configured in a plane-parallel shape, and the optical partial body is likewise in a plane-parallel shape.

7. The apparatus according to claim 1, wherein at least one of the at least two mirrors is implemented as a splitter layer, so that there is only partial shadowing at the center of a distance sensor, for detecting the measurement light beam reflected by the target object, which is positioned orthogonally with respect to the optical axis of the light-refracting component and the sensor midpoint of which is intersected by the optical axis.

8. The apparatus according to claim 1, wherein the optical overall body comprises the light-refracting component so that both the measurement light beam offset and optical imaging are carried out.

9. The according to claim 7, wherein the splitter layer is adjusted in such a way that near-field measurements are made possible.

10. The apparatus according to claim 7, wherein the splitter layer is adjusted such that it selectively constitutes a splitter for the wavelength of the measurement light source used.

11. The apparatus according to claim 1, wherein two parallel surfaces, on which two of the at least two mirrors are fitted, of the at least one first optical body form an equal angle with respect to the incidence direction of the measurement light beam.

12. The apparatus according to claim 4, wherein both the optical body and the optical partial body are configured as a glass body or as a plastic body, or the light-refracting component is formed as a diffractive optical element.

13. A coordinate measuring device comprising the apparatus according to claim 7, such that surveys in the near-field range can be carried out with the aid of the coordinate measuring device.

14. The coordinate measuring device according to claim 13, wherein the coordinate measuring device is configured as a theodolite, tachymeter or total station.

* * * * *